United States Patent [19]
Wong et al.

[11] Patent Number: 6,070,242
[45] Date of Patent: May 30, 2000

[54] METHOD TO ACTIVATE UNREGISTERED SYSTEMS IN A DISTRIBUTED MULTISERVER NETWORK ENVIRONMENT

[75] Inventors: Thomas K. Wong, Pleasanton; Sanjay R. Radia, Fremont, both of Calif.

[73] Assignee: Sun Microsystems, Inc., Palo Alto, Calif.

[21] Appl. No.: 08/763,212

[22] Filed: Dec. 9, 1996

[51] Int. Cl.[7] .............................. G06F 12/14; G06F 15/16
[52] U.S. Cl. ............................................ 713/201; 709/229
[58] Field of Search ........................ 395/187.01, 188.01, 395/200.5, 200.51, 200.53, 200.55, 285, 200.59; 709/245, 228, 227, 229; 370/401, 402, 403, 404, 405; 713/201

[56] References Cited

U.S. PATENT DOCUMENTS

| | | | |
|---|---|---|---|
| 5,276,680 | 1/1994 | Messenger | 370/85.1 |
| 5,535,338 | 7/1996 | Krause et al. | 395/200.2 |
| 5,539,881 | 7/1996 | Hunt et al. | 395/200.02 |
| 5,604,490 | 2/1997 | Blakley, III et al. | 340/825.31 |
| 5,699,513 | 12/1997 | Feigen et al. | 395/187.01 |
| 5,727,146 | 3/1998 | Savoldi et al. | 395/187.01 |
| 5,737,523 | 4/1998 | Callaghan et al. | 395/187.01 |
| 5,790,548 | 8/1998 | Sistanizadeh | 370/401 |
| 5,826,014 | 10/1998 | Coley et al. | 395/187.01 |

OTHER PUBLICATIONS

Steven M. Bellovin and William R. Cheswick, "Network Firewalls," IEEE Communications Magazine, vol. 32, No. 9, Sep. 1, 1994, pp. 50–57, XP000476555.

Johna Till Johnson, "Distributed Computing Comes to the Mainframe," Data Communications, vol. 24, No. 14, Oct. 1, 1995, pp. 39 and 40, XP000533347.

Brent D. Chapman, Elizabeth D. Zwicky, Building Internet Firewalls, Chapter 6 "Packet Filtering," pp. 131–188, (O'Reilley & Associates, 1995).

R. Droms, "Dynamic Host Configuration Protocol", *RFC 1541*, Bucknell University, Oct. 1993.

Fred Simonds, Network Security Data and Voice Communications, Chapter 10 "Firewalls: TCP/IP and Internet Security," pp. 215–268, (McGraw–Hill, 1996).

*Primary Examiner*—Stuart S. Levy
*Assistant Examiner*—Kenneth W. Fields
*Attorney, Agent, or Firm*—O'Melveny & Myers LLP

[57] ABSTRACT

The present invention includes a method and apparatus for registering devices in a computer network. Initially, for an unregistered device, the network establishes a unregistered enabled packet filter. The unregistered enabled packet filter discards all IP packets that originate at the unregistered device, except IP packets addressed to a registration server. IP packets sent to the registration server allow a user to authenticate the unregistered device. Subsequently, the network replaces the unregistered enabled packet filter with a registered enable packet filter. The registered enabled packet filter allows the device to send packets to a login server within the computer network. Subsequently, if the user fails to pay subscription fees (of for other applicable reason) the registered enabled packet filter may be replaced with a registered disabled packet filter to prevent the device from sending packets to the network. Devices used in attacks against the network may be assigned unregistered disabled packet filter to prevent their use in subsequent attacks.

12 Claims, 6 Drawing Sheets

METHOD TO ACTIVATE UNREGISTERED SYSTEMS IN A DISTRIBUTED MULTISERVER NETWORK ENVIRONMENT

RELATED APPLICATIONS

The following co-pending patent applications, which were filed on Dec. 9, 1996, are related to the subject application and are herein incorporated by reference:

1. Application Ser. No. 08/763,234, entitled "Method and Apparatus for Client-Sensitive Name Resolution Using DNS" of Swee Boon Lim, Sanjay R. Radia, and Thomas Wong.

2. Application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman.

3. Application Ser. No. 08/762,402, entitled "Method and Apparatus for Dynamic Packet Filter Assignments" of Sanjay R. Radia, Swee Boon Lim, Panagiotis Tsirigotis, Thomas Wong, Rob Goedman, and Michael W. Patrick.

4. Application Ser. No. 08/763,289, entitled "Load Balancing and Failover of Network Services" of Swee Boon Lim, Ashish Singhai, and Sanjay R. Radia.

5. Application Ser. No. 08/763,068, entitled "Secure DHCP Server" of Swee Boon Lim, Sanjay R. Radia, Thomas Wong, Panagiotis Tsirigotis, and Rob Goedman.

6. Application Ser. No. 08/762,709, entitled "A Method and Apparatus for Assignment of IP Addresses" of Thomas Wong, Swee Boon Lim, Sanjay R. Radia, Panagiotis Tsirigotis, Rob Goedman, and Michael W. Patrick.

7. Application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick.

8. Application Ser. No. 08/762,705, entitled "Dynamic Cache Preloading Across Loosely Coupled Administrative Domains" of Panagiotis Tsirigotis and Sanjay R. Radia. The following co-pending patent application is related to the subject application and is herein incorporated by reference:

9. U.S. application Ser. No. 08/673,951, filed Jul. 1, 1996, entitled "A Name Service for a Redundant Array of Internet Servers" of Swee Boon Lim.

FIELD OF THE INVENTION

The present invention relates generally to security in computer networks. More specifically, the present invention is a method for registration of systems in a multiserver network environment.

BACKGROUND OF THE INVENTION

In traditional computer networks, it has often been the case that each network component is under the control of a single organization, such as a company or university. Recently, however, computer networks have been expanded so that a single network includes many systems located at widely dispersed locations including businesses and private residences. One way in which this is being accomplished is through the use of cable networks. More specifically, cable networks are created by using special cable modems and cable routers in combination with the networking connections previously established to provide cable television signals. The use of cable networks is proving to be an effective way to bring high-performance computer networking to home and business users.

Security within cable networks presents certain problems that are not necessarily applicable to traditional computer networks. Many of these problems stem from the fact that large portions of cable networks may not be under the control of the entities that wish to provide services using the cable networks. For example, the cable modems used in cable networks are typically located in the user's home. Thus, cable modems require certain security methods that may not be required in traditional computer networks.

For example, to limit the cost of service to customers, it is desirable to allow users to purchase and install their own cable modems. This avoids the cost of sending a technician to the customer's house or business. Unfortunately, allowing customers to connect their own modems to a cable network makes the network subject to several possible attacks. One of these attacks is known as a "denial of service" attack. For this attack, a malicious user uses a cable modem to flood the cable network with messages. This overloads the network, degrading the quality of service received by legitimate users. A second type of attack occurs when a malicious user uses a cable modem to forge the network address assigned to a legitimate user. Address forging results in two systems having the same network address. The resulting confusion within the network once again degrades the quality of service received by legitimate users.

As a result, there is a need for a system that allows users to install their own cable modems while preserving the security of the cable network.

SUMMARY OF THE INVENTION

A preferred embodiment of the present invention includes a method and apparatus for controlling access to services within a computer network. More specifically, a preferred environment for the present invention is a computer network that includes a series of server systems, a series of client systems and a router. An access network control server (ANCS) controls configuration of the network components. A services management system (SMS), dynamically reconfigures the ANCS. The network also includes a DHCP server that implements the Dynamic Host Configuration Protocol (DHCP) defined in Internet RFC 1541. The client systems, which are typically personal computers using cable modems, connect to the router. As part of the connection process, each client system receives a dynamically allocated IP address from the DHCP server.

Within the network, the SMS maintains a set of filtering profiles. Each filtering profile includes one or more filtering rules. Each filtering rule included in a filtering profile is designed to forward or discard IP packets that originate from the client systems. Four of these filtering profiles correspond to the status of the cable modem that connects a client system to the network. A first of these four filtering profiles is a "registered enabled" filtering profile. The registered enabled filtering profile is used with cable modems that have been registered with the network and with users who are authorized to use network services. The filtering rules included in the registered enabled profile are designed to forward packets that originate at the client system connected to the cable modem that allow a user to login to the network.

The second filtering profile is a "registered disabled" filtering profile. This filtering profile is used with cable modems that have been registered with the network and with users who are not authorized to use network services (i.e., users who have let their subscriptions to network services lapse). The filtering rules included in the registered disabled profile are designed to prevent packets that originate at the client system connected to the cable modem from reaching the network.

The third filtering profile is an "unregistered enabled" filtering profile. The unregistered enabled filtering profile is used with cable modems that have not yet been registered with the network. The filtering rules included in the unregistered enabled profile are designed to forward packets that originate at the client system connected to the cable modem and are directed a special registration server system. The special registration server system includes an application that allows a user to register a previously unregistered cable modem.

Finally, the fourth filtering profile is an "unregistered disabled" filtering profile. This profile is used with cable modems that have not been previously registered and are not currently allowed to register. Typically, the fourth filtering profile is used with cable modems that have been used in previous attacks against the network. The filtering rules included in the unregistered disabled profile are designed to prevent packets that originate at the client system connected to the cable modem from reaching the network.

After a client system is allocated an IP address from the DHCP server, the SMS uses the modem id to select one of the four filtering profiles. Subsequently, the selected filtering profile is downloaded by the SMS to the ANCS. The ANCS uses the rules included in the downloaded filtering profile sequence to establish a packet filter for IP packets originating from the user's host system. The new packet filter is established by reconfiguring the components of the network that forward IP packets originating at the user's host system. For example, the packet filter may be established by reconfiguring the router that connects the user's host system to the network. Alternatively, the packet filter may be established by reconfiguring the cable modem that connects the user's host system to the router.

Subsequently, the new packet filter uses the rules of the user's filtering profile sequence to selectively forward or discard IP packets originating from the user's host system. Specifically, the packet filter forwards or discards packets in accordance with the rules included the selected filtering profile. In the case where the SMS has selected the unregistered enabled filtering profile, the user may access the registration application included in a special registration server to register the cable modem connecting the client system to the network. The SMS will then replace the unregistered enable filtering profile with the registered enabled filtering profile, allowing the user to login to the network.

In accordance with the purpose of the invention, as embodied and broadly described herein, the present invention is a method for registering a previously unregistered device in a computer network, the method comprising the steps of: establishing an unregistered enabled packet filter in the computer network, the unregistered enabled packet filter discarding all IP packets that originate at the unregistered device and that are not directed at a registration server included in the network, collecting information to conditionally authenticate the unregistered device, and replacing, for unregistered devices that are authenticated, the unregistered enabled packet filter with a registered enabled packet filter, the registered enabled packet filter selectively forwarding IP packets that originate at the unregistered device and that are directed at one or devices included in the network.

In further accordance with the purpose of the invention, as embodied and broadly described herein, the present invention is a computer program product comprising: a computer usable medium having computer readable code embodied therein for registering a previously unregistered device in a computer network, the computer program product comprising: first computer readable program code devices configured to cause a computer system to establish an unregistered enabled packet filter in the computer network, the unregistered enabled packet filter discarding all IP packets that originate at the unregistered device and that are not directed at a registration server included in the network, second computer readable program code devices configured to cause a computer system to collect information to conditionally authenticate the unregistered device, and third computer readable program code devices configured to cause a computer system to replace, for unregistered devices that are authenticated, the unregistered enabled packet filter with a registered enabled packet filter, the registered enabled packet filter selectively forwarding IP packets that originate at the unregistered device and that are directed at one or devices included in the network.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
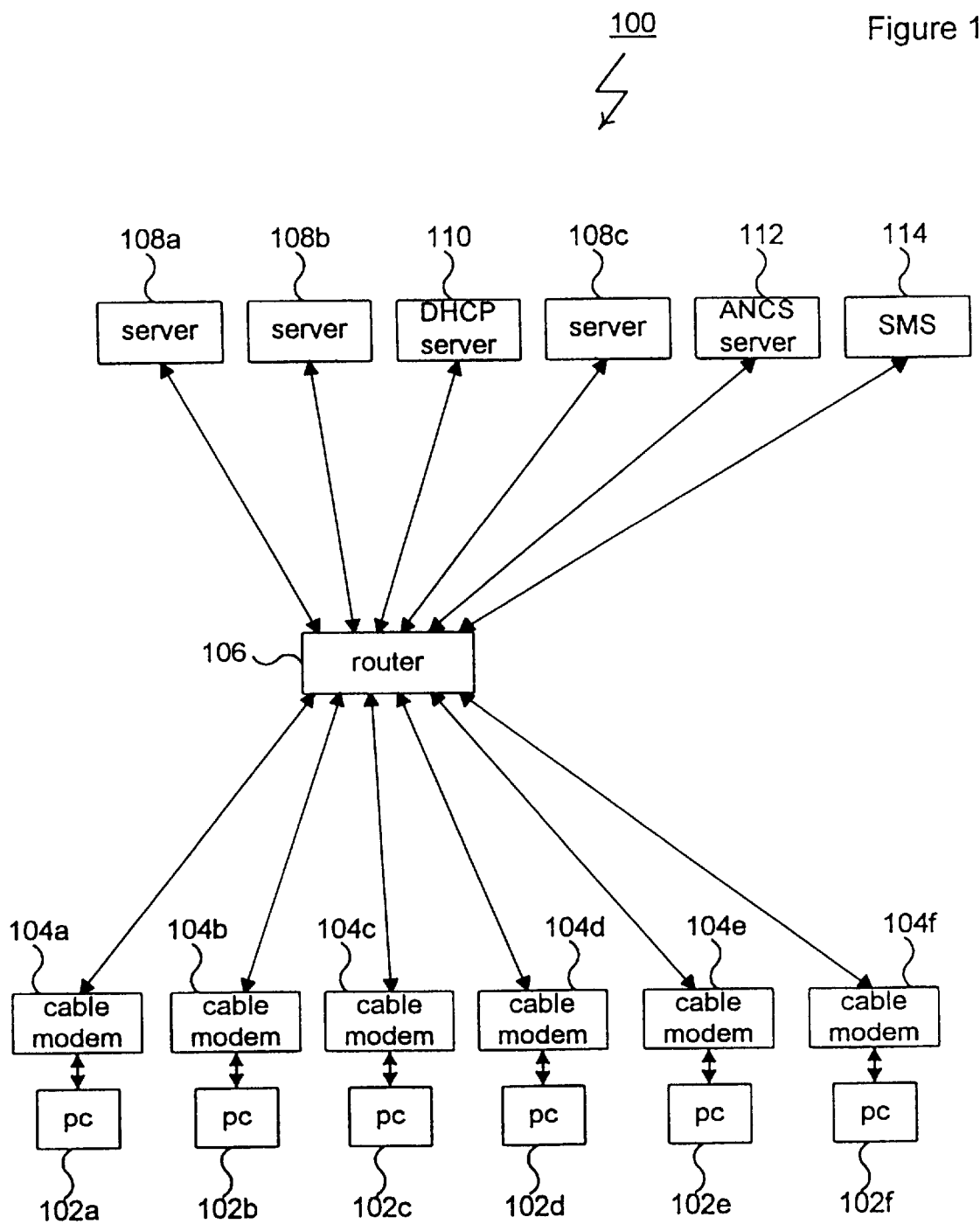
FIG. 1 is a block diagram of a computer network shown as a representative environment for a preferred embodiment of the present invention.

FIG. 1 shows a computer network 100 as a representative environment for the present invention. Structurally, computer network 100 includes a series of client systems 102, of which client systems 102a through 102f are representative. Each client system 102 may be selected from a range of differing devices including, but not limited to the personal computers shown in FIG. 1. A cable modem 104 is connected to each client system 102. Each cable modem 104 is connected, in turn, to a cable router 106. The use of cable router 106 and cable modems 104 is also intended to be exemplary and it should be appreciated that other networking technologies and topologies are equally practical. It should also be appreciated that a number of different cable modems and cable routers are available from various manufactures. In particular, cable modem 104 can be a Cyber-SUFR cable modem and cable router 106 can be a Cable-MASTR cable router, both supplied by Motorola, Inc.

Network 100 also includes a series of server systems 108, of which server systems 108a through 108c are representative. Each server system 108 is connected to cable router 106. Generally, server systems 108 are intended to represent the broad range of server systems that may be found within computer networks.

A DHCP server system 110 is also included in computer network 100 and connected to cable router 106. DHCP server system 110 is a computer or other system that implements Dynamic Host Configuration Protocol (DHCP) defined in Internet RFC 1541, which is incorporated herein by reference. Functionally, DHCP server system 110 provides for allocation of IP addresses within network 100. When client systems 102 initially connect to cable router 106, each client system 102 requests and receives an IP address from DHCP server system 110. Although FIG. 1 shows only a single DHCP server system 110, it is to be understood that additional DHCP server systems 110 may be used without departing from the spirit of the present invention.

Figure 2:
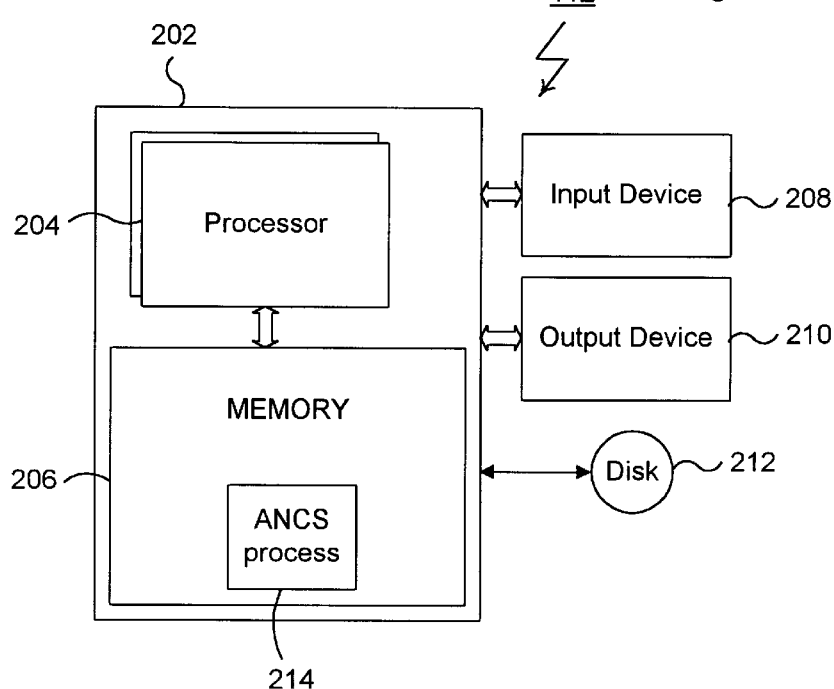
FIG. 2 is a block diagram of an access network control server (ANCS) as used by a preferred embodiment of the present invention.

Computer network 100 also includes an access network control server (ANCS) 112 and a services management system (SMS) 114. Both ANCS 112 and SMS 114 are connected to cable router 106. ANCS 112 is shown in more detail in FIG. 2 to include a computer system 202 that, in turn, includes a processor, or processors 204, and a memory 206. An input device 208 and an output device 210 are connected to the computer system 202 and represent a wide range of varying I/O devices such as disk drives, keyboards, modems, network adapters, printers and displays. A disk drive 212, of any suitable disk drive type, is shown connected to computer system 202. An ANCS process 214 is shown to be resident in memory 206 of computer system 202.

Figure 3:
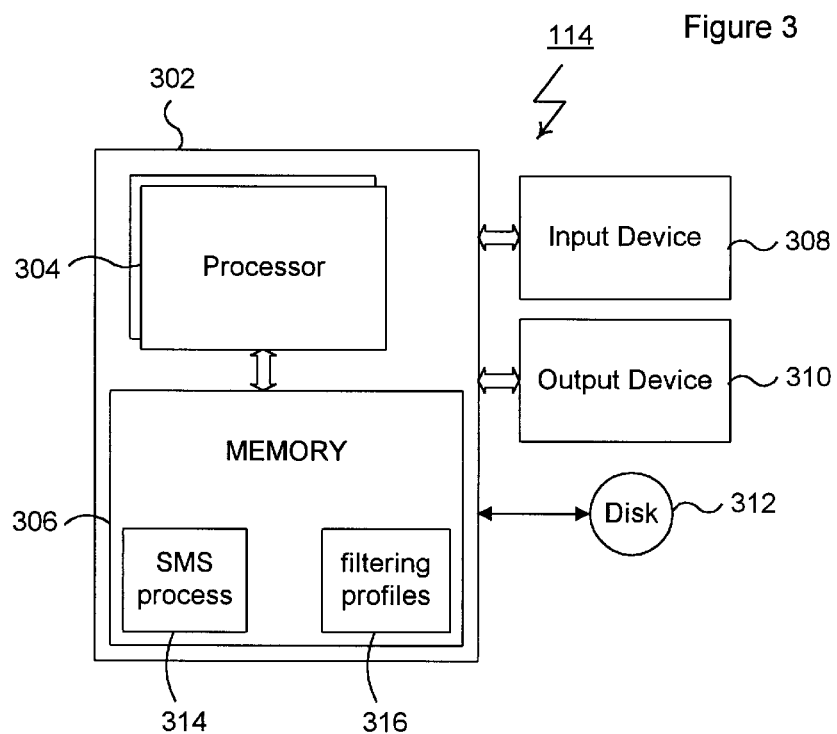
FIG. 3 is a block diagram of a services management system (SMS) as used by a preferred embodiment of the present invention.

SMS 114 is shown in more detail in FIG. 3 to include a computer system 302 that, in turn, includes a processor, or processors 304, and a memory 306. An input device 308 and an output device 310 are connected to the computer system 302 and represent a wide range of varying I/O devices such as disk drives, keyboards, modems, network adapters, printers and displays. A disk drive 312, of any suitable disk drive type, is shown connected to computer system 302. An SMS process 314 and a filtering profile database 316 are shown to be resident in memory 306 of computer system 302. In FIG. 1, ANCS 112 and SMS 114 are shown as separate entities. It should be appreciated, however, that the present invention specifically anticipates that ANCS 112 and SMS 114 may be implemented using a single computer system that includes ANCS process 214, SMS process 314 and filtering profile database 316.

Figure 4:
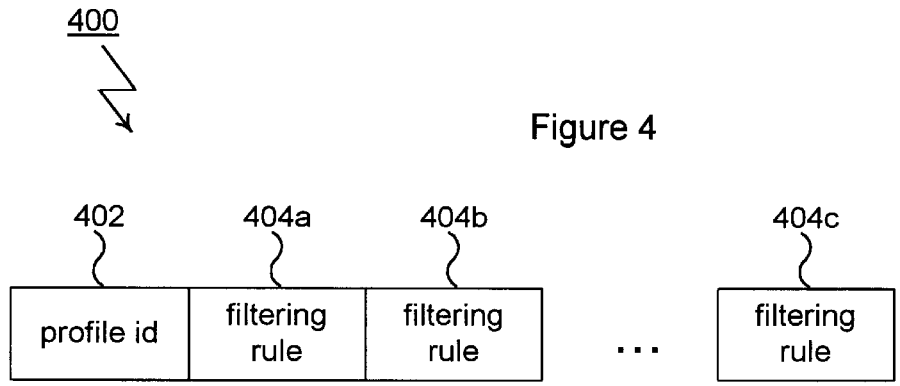
FIG. 4 is a block diagram of a filtering profile as used in a preferred embodiment of the present invention.
Figure 5:
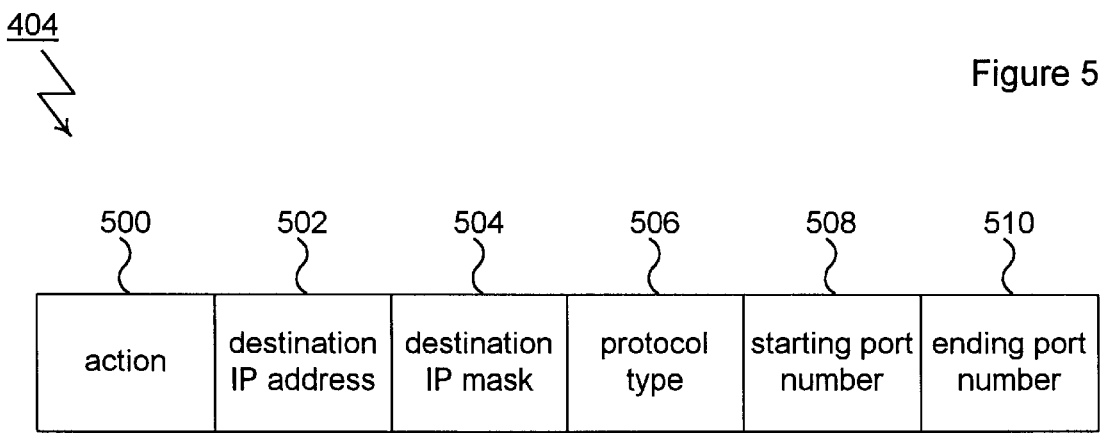
FIG. 5 is a block diagram of a filtering rule as used in a preferred embodiment of the present invention.

Within network 100, SMS 114 maintains a series of filtering profiles of the type shown in FIG. 4 and generally designated 400. Filtering profile 400 includes a profile id 402 and a series of filtering rules, of which filtering rules 404a through 404c are representative. The profile id 402 is used by SMS 114 and ANCS 112 as an internal identifier for the filtering profile 400. The filtering rules 404 included in a filtering profile 400 are better understood by reference to FIG. 5. In FIG. 5, it may be seen that each filtering rule 404 includes an action 500. Action 500 specifies the disposition of IP packets that are matched by a particular filtering rule 404. In particular, action 500 may indicate that a matched IP packet will be forwarded, or that a matched IP packet will be discarded. Filtering rule 404 also includes a destination IP address 502 and a destination IP mask 504. Destination IP address 502 corresponds to the destination address included in the header of an IP packet. Destination IP mask 504 is similar to destination IP address 502 but corresponds to a range of destination addresses. To match a particular filtering rule 404, an IP packet must either have a destination address that matches the destination address 502 included in the filtering rule 404 or have a destination address that is included in the destination address mask 504 of the filtering rule 404.

Filtering rule 404 also includes a protocol type 506. Protocol type 506 corresponds to the protocol type of an IP packet. Thus, the protocol type 506 of each filtering rule 404 has a value that corresponds to an IP packet type, such as TCP, UDP, ICMP, etc. To match a particular filtering rule 404, an IP packet must have a protocol type that matches the protocol type 506 included in the filtering rule 404.

Finally, for the embodiment shown, filtering rule 404 includes a starting port number 508 and an ending port number 510. Starting port number 508 and ending port number 510 define a range of port numbers of the type used by certain protocols, such as UDP and TCP. To match a particular filtering rule 404, an IP packet of one of these types must have a port number that falls within the range defined by starting port number 508 and ending port number 510.

Figure 6:
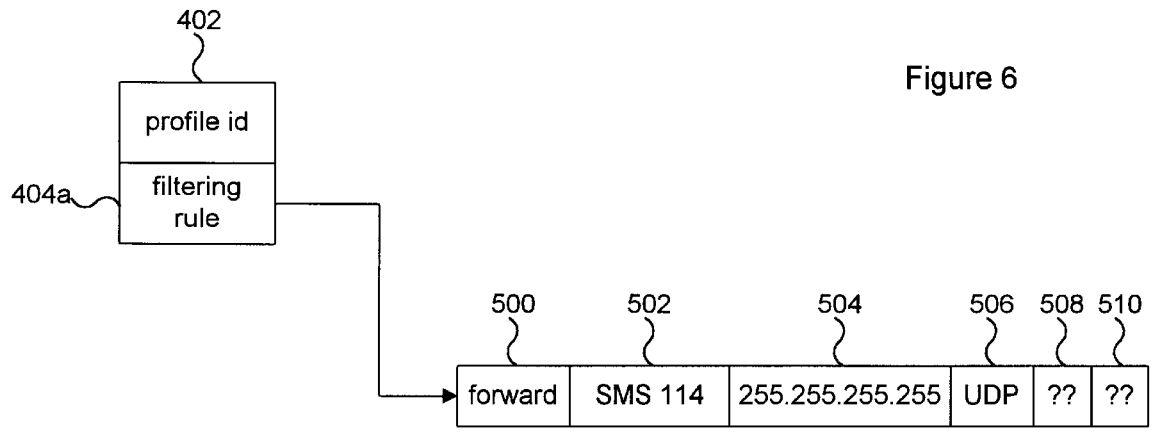
FIG. 6 is a block diagram of a registered enabled filtering profile as used in a preferred embodiment of the present invention.

For the purposes of the present invention, the filtering profiles 400 maintained by SMS 114 include a registered enabled filtering profile 400, a registered disabled filtering profile 400, an unregistered enabled filtering profile 400, and an unregistered disabled filtering profile 400. The registered enabled filtering profile 400 is shown in more detail in FIG. 6. More specifically, in FIG. 6, registered enabled filtering profile 400 includes a single filtering rule 404. Filtering rule 404a includes an action 500 indicating that IP packets that match the filtering rule 404a should be forwarded. Additionally, filtering rule 404a includes a destination address 502 that corresponds to the IP address of SMS 114. The destination address mask 504 of filtering rule 404a is set to 255.255.255.255 and the protocol type 506 of filtering rule 404a is set to UDP. Finally, the starting port number 508 and ending port number 510 of filtering rule 404a are set to values that are appropriate to a particular implementation of the present invention. This is shown symbolically in FIG. 6 as starting port number 508 being set to the value P1 and ending port number being set to the value P2.

Figure 7:
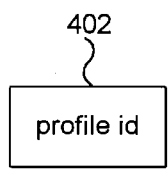
FIG. 7 is a block diagram of a registered disabled filtering profile as used in a preferred embodiment of the present invention.

The registered disabled filtering profile 400 is shown in more detail in FIG. 7 As shown FIG. 7, registered disabled filtering profile 400 includes no filtering rules 404.

Figure 8:
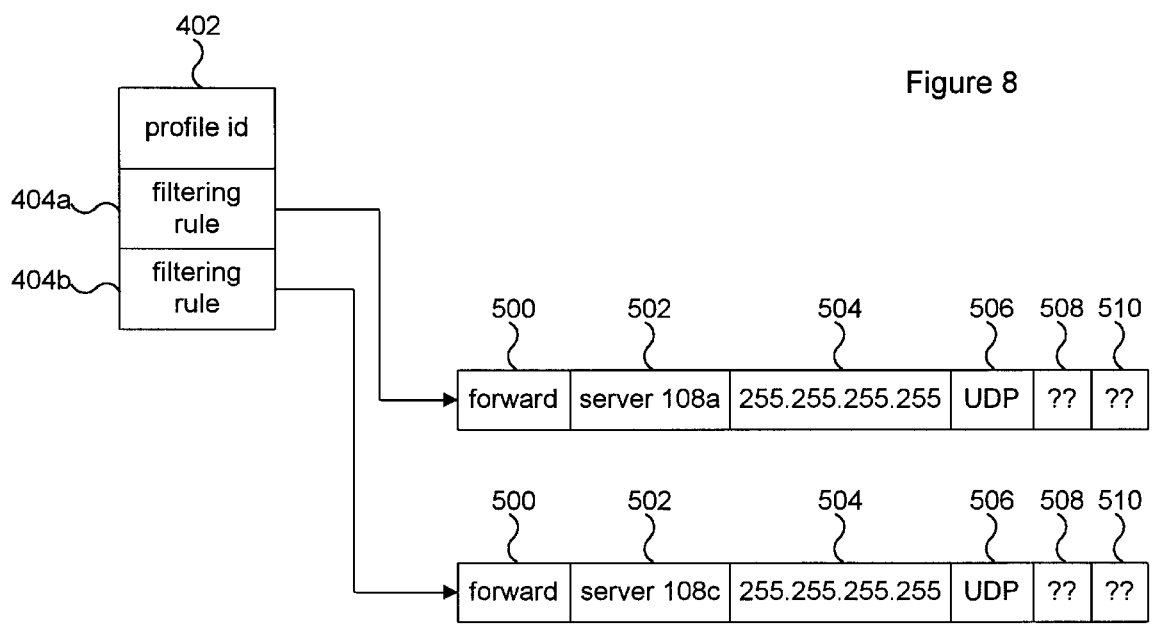
FIG. 8 is a block diagram of an unregistered enabled filtering profile as used in a preferred embodiment of the present invention.

The unregistered enabled filtering profile 400 is shown in more detail in FIG. 8. More specifically, in FIG. 8, unregistered enabled filtering profile 400 includes two filtering rules, 404a and 404b respectively. Filtering rule 404a includes an action 500 indicating that IP packets that match the filtering rule 404a should be forwarded. Additionally, filtering rule 404a includes a destination address 502 that corresponds to the IP address of server system 108a. The destination address mask 504 of filtering rule 404a is set to 255.255.255.255 and the protocol type 506 of filtering rule 404a is set to UDP. Finally, the starting port number 508 and ending port number 510 of filtering rule 404a are set to values that are appropriate to a particular implementation of the present invention. This is shown symbolically in FIG. 8 as starting port number 508 being set to the value P1 and ending port number being set to the value P2.

For filtering rule 404b, an action 500 is included that indicates that IP packets that match the filtering rule 404b should be forwarded. Additionally, filtering rule 404b includes a destination address 502 that corresponds to the IP address of server system 108c. In this example, servers 108a and 108c are registration servers that allow a client system 102 to register a cable modem 104. The destination address mask 504 of filtering rule 404b is set to 255.255.255.255 and the protocol type 506 of filtering rule 404b is set to UDP. Finally, the starting port number 508 and ending port number 510 of filtering rule 404b are set to values that are appropriate to a particular implementation of the present invention. This is shown symbolically in FIG. 8 as starting port number 508 being set to the value P1 and ending port number being set to the value P2.

Figure 9:
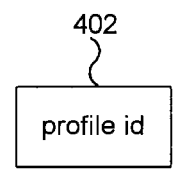
FIG. 9 is a block diagram of an unregistered disabled filtering profile as used in a preferred embodiment of the present invention.

The unregistered disabled filtering profile 400 is shown in more detail in FIG. 9 As shown FIG. 9, unregistered disabled filtering profile 400 includes no filtering rules 404.

Figure 10:
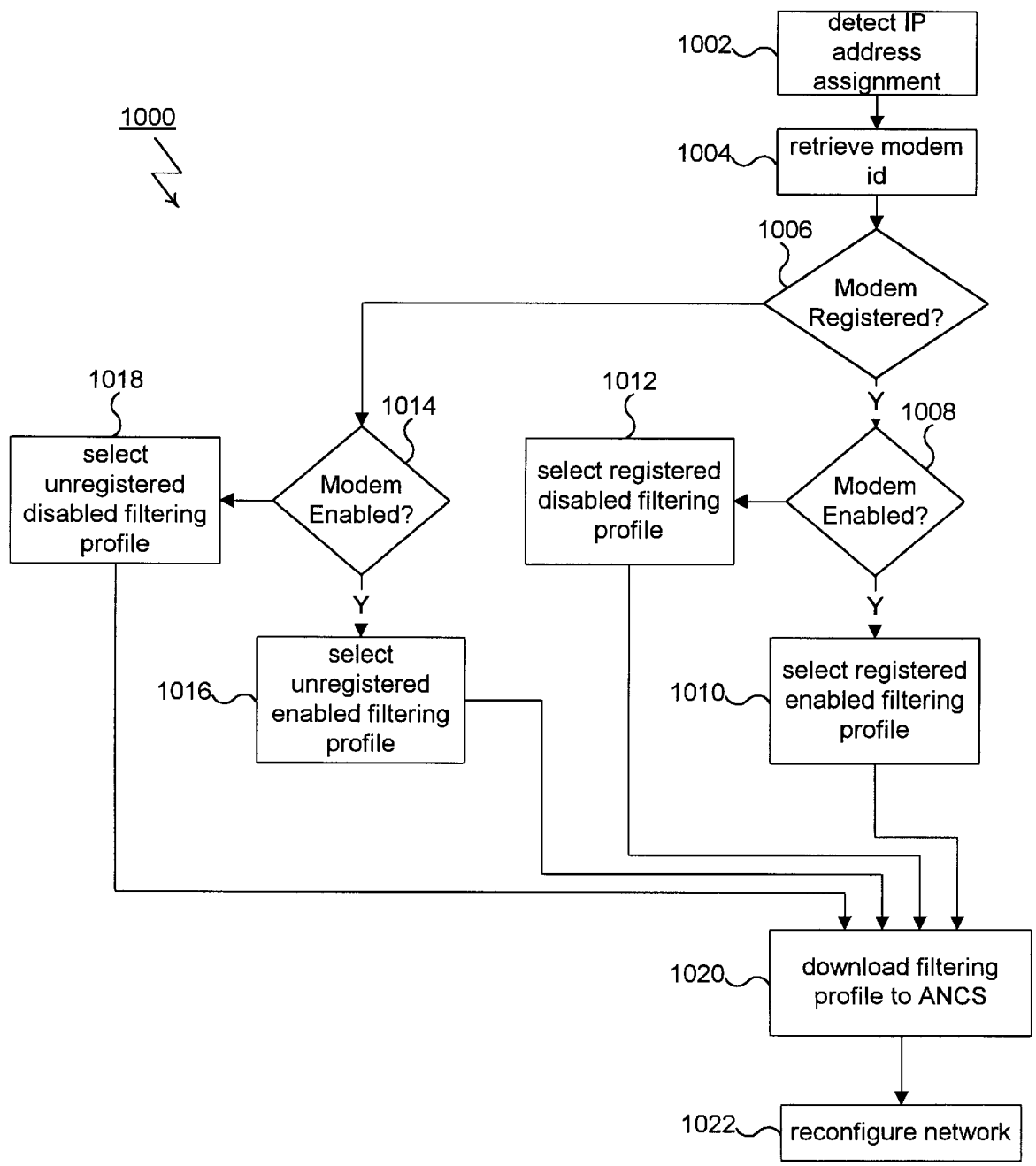
FIG. 10 is a flowchart showing the steps associated with a preferred embodiment of a method for access control in a computer network.

A preferred embodiment of a method for access control is shown in FIG. 10 and generally designated 1000. Method 1000 begins with step 1002 where SMS 114 detects the assignment of an IP address to a client system 102. More specifically, for a preferred embodiment of the present invention, client systems 102 are dynamically allocated IP addresses by DHCP server 110. As part of the process of IP address allocation, DHCP server 110 sends a DHCPACK message informing a client system 102 that it may use an allocated IP address. SMS 114 monitors and detects assignment of IP addresses to client systems by detecting DHCPACK messages within network 100. Step 1002 corresponds, in a general sense, to the methods and procedures that are executed by SMS 114 to detect DHCPACK messages within network 100.

In step 1004 SMS 114 retrieves the modem id associated with the client system 102 that has been allocated an IP address by DHCP server 110. Steps 1010 through 1018 that follow, represent one possible method that SMS 114 may use to select a filtering profile 400 based on the modem id retrieved in step 1004. Since these steps are capable of many differing implementations, they will not be discussed in detail. In particular, however, it should be noted that the SMS 114, in steps 1010 through 1018, selects a filtering profile 400 based on the following truth table.

|  | Modem Registered | Modem Unregistered |
| --- | --- | --- |
| Modem Enabled | registered enabled filtering profile | unregistered enabled filtering profile |

-continued

|  | Modem Registered | Modem Unregistered |
| --- | --- | --- |
| Modem Disabled | registered disabled filtering profile | unregistered disabled filtering profile |

Steps 1010, 1012, 1016 and 1018, are followed by step 1020 where the selected filtering profile 400 is downloaded by SMS 114 to ANCS 112. At the same time, the SMS 114 passes the IP address of the client system 102 to the ANCS 112. In the following step, the ANCS 112 uses each of the filtering rules 404 included in the selected filtering profile 400 to establish a packet filter for IP packets originating from the client system 102. The packet filter is established by reconfiguring one or more of the components of the network 100 that forward packets originating at the client system 102. For example, in some cases, the packet filter may be established by reconfiguring the modem 104 connected to the client system 102. Alternatively, the packet filter may be established by reconfiguring router 106. Preferably, ANCS 112 reconfigures the network components using a standardized protocol that may be used in combination with the components of network 100. Subsequently, the packet filter established by the ANCS 112 is used to filter IP packets that originate from the client system 102.

In particular, the filtering rule 402 included in the registered enabled filtering profile 400 is used by the ANCS 112 to establish a registered enabled packet filter. The registered enabled packet filter allows users having registered and enabled modems to send IP packets to SMS 114. These IP packets allow the user to login to the network 100.

The filtering rules 402a and 402b included in the unregistered enabled filtering profile 400 used by the ANCS 112 to establish an unregistered enabled packet filter. The unregistered enabled packet filter allows users having unregistered but enabled modems to send IP packets to special registration servers (in the case of network 100 these are servers 108a and 108c). These IP packets allow these users to registers their cable modems 104.

Finally, as shown in FIGS. 7 and 9, registered disabled filtering profile 400 and unregistered disabled filtering profile 400 include no filtering rules 402. For these filtering profiles 400, the ANCS 112 constructs a registered disabled packet filter and a unregistered disabled packet filter, respectively. The registered disabled packet filter and unregistered disabled packet filter discard all IP packets that originate from a cable modem 104. Thus, users having disabled modems are not allowed to send any IP packets (In the described embodiment, IP packets that do not match any filtering rules 404 are discarded). This prevents these users from accessing the network 100 or attacking the network 100.

Figure 11:
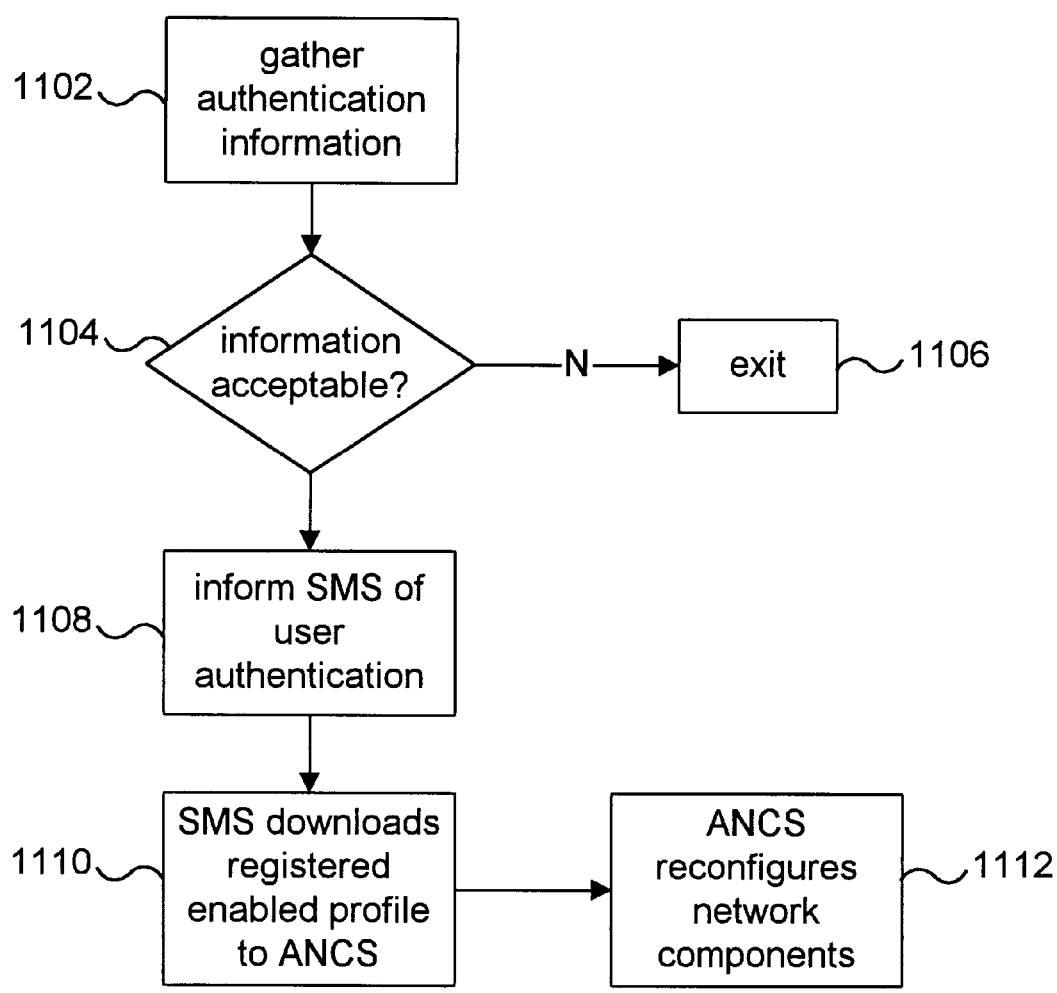
FIG. 11 is a flowchart showing the steps associated with a preferred embodiment of a method for modem registration in a computer network.

A preferred method for modem registration is shown in FIG. 11 and generally designation 1100. It should be appreciated that unknown cable modems 104 (i.e., those that have not been registered) are initially assigned the unregistered enabled filtering profile 400. As discussed, the filtering rules 402 included in the unregistered enabled filtering profile 400 restrict the cable modem 104 to sending IP packets to the registration servers 108a or 108c. This reduces the ability of a user to attack network 100 using an unregistered cable modem 104.

Method 1100 begins with step 1102 where a registration process, executing, for example, on one of the registration servers 108a or 108c, gathers validation information from the user. Typically, this information will include the user's name and address, billing information as well as information that identifies the modem 104 being registered, such as the modem serial number.

In step 1104 the registration process analyzes the validation information gathered in step 1102. Generally, this type of analysis may involve steps such as checking the modem serial number against a list of modem serial numbers that have been used in previous network attacks. A technician may also be consulted to determine if the user has an adequate credit history or is otherwise considered to be worthy. If the user's validation fails, execution of method 1100 terminates at step 1106. Alternatively, in step 1108, the registrations server 108a or 108c informs the SMS 114 that the modem 104 has been registered.

Subsequently, in step 1110, the SMS 114 downloads the registered enabled filtering profile 400 to the ANCS 112 along with the IP address of the client system 102 connected to the now registered modem 104. In response, the ANCS 112 uses the filtering rule 404 included in the registered enabled filtering profile 400 to establish a new packet filter for IP packets originating from the client system 102. Subsequently, the packet filter established by the ANCS 112 is used to filter IP packets that originate from the client system 102. In particular, the client system 102 is allowed to send packets to SMS 114. These packets allow the user to login to the network 100.

It should be appreciated that the above description of the present invention is intended to be exemplary. In particular, the present invention is intended to be generally applicable to network devices and it not limited to the cable modems 104 described. It should also be appreciated that other methods may be used to establish packet filters used in network 100 without departing from the spirit of the present invention.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. In a computer network including at least one registration server, a client device, an allocation server for assigning a network address to the client device, and a computer system, a method for controlling the registration of the client device in the computer network, the method comprising the steps, performed by the computer system, of:
   detecting the assignment of a network address from the allocation server to the client device;
   establishing an unregistered enabled packet filter in the computer network when the assignment of the network address is detected, the unregistered enabled packet filter discarding all IP packets that originate at the client device and that are not directed at the registration server, thereby allowing a user of the client device to register the client device through the computer network while preventing the client device from sending IP packets to other devices in the computer network; and
   replacing, if the registration server authenticates the client device, the unregistered enabled packet filter with a registered enabled packet filter, the registered enabled packet filter selectively forwarding IP packets that originate at the client device and that are directed at one or more devices included in the computer network.

2. A method as recited in claim 1 wherein the computer network includes a router and wherein the steps of establishing an unregistered enabled packet filter and replacing the unregistered enabled packet filter include the step of reconfiguring the router to selectively forward packets originating at the client device.

3. A method as recited in claim 1 wherein the client device is a cable modem and wherein the steps of establishing an unregistered enabled packet filter and replacing the unregistered enabled packet filter include the step of reconfiguring the cable modem to selectively forward IP packets.

4. A method as recited in claim 1 further comprising the step of replacing the registered enabled packet filter with a registered disabled packet filter when the registered client device is disabled, the registered disabled packet filter discarding all IP packets that originate at the client device, thereby preventing the registered disabled client device from accessing the computer network.

5. A computer program product comprising:
   a computer usable medium having computer readable code embodied therein for controlling the registration of a device in a computer network, the computer program product comprising:
      first computer readable program code devices configured to cause a computer system to detect the assignment of a network address from an allocation server to the device;
      second computer readable program code devices configured to cause the computer system to establish an unregistered enabled packet filter in the computer network when the assignment of the network address is detected, the unregistered enabled packet filter discarding all IP packets that originate at the device and that are not directed to at least one registration server included in the computer network, thereby allowing a user of the device to register the device while preventing the device from sending IP packets to other devices in the computer network; and
      third computer readable program code devices configured to cause the computer system to replace, if the registration server authenticates the device, the unregistered enabled packet filter with a registered enabled packet filter, the registered enabled packet filter selectively forwarding IP packets that originate at the device and that are directed at one or more devices included in the computer network.

6. A computer program product as recited in claim 5 wherein the computer network includes a router and wherein the first computer readable program code devices and third computer readable program code devices are configured to cause a computer to reconfigure the router to selectively forward IP packets originating at the device.

7. A computer program product as recited in claim 5 wherein the device is a cable modem and wherein the first computer readable program code devices and third computer readable program code devices are configured to cause a computer to reconfigure the cable modem to selectively forward IP packets.

8. A computer program product as recited in claim 5 further comprising fourth computer readable program code devices configured to cause a computer system to replace the registered enabled packet filter with a registered disabled packet filter when the registered device is disabled, the registered disabled packet filter discarding all IP packets that originate at the registered device, thereby preventing the registered device from accessing the computer network.

9. An apparatus for controlling the registration of a device in a computer network, the apparatus comprising:
   a first portion configured to cause a computer system to detect the assignment of a network address from an allocation server to the device;

a second portion configured to cause a computer system to establish an unregistered enabled packet filter in the computer network when the assignment of the network address is detected, the unregistered enabled packet filter discarding all IP packets that originate at the device and that are not directed at a registration server included in the network, thereby allowing a user of the device to register the device through the computer network while preventing the device from sending IP packets to other devices in the computer network; and a third portion configured to cause a computer system to replace, if the registration server authenticates the device, the unregistered enabled packet filter with a registered enabled packet filter, the registered enabled packet filter selectively forwarding IP packets that originate at the device and that are directed at one or more devices included in the network.

10. An apparatus as recited in claim 9 wherein the computer network includes a router and wherein the first portion and third portion are configured to cause a computer to reconfigure the router to selectively forward IP packets originating at the device.

11. An apparatus as recited in claim 9 wherein the device is a cable modem and wherein the first portion and third portion are configured to cause a computer to reconfigure the cable modem to selectively forward IP packets.

12. An apparatus as recited in claim 9 further comprising a fourth portion configured to cause a computer system to replace the registered enabled packet filter with a registered disabled packet filter when the registered device is disabled, the registered disabled packet filter discarding all IP packets that originate at the registered device, thereby preventing the registered device from accessing the computer network.

* * * * *